United States Patent [19]

Esaki et al.

[11] 3,903,330

[45] Sept. 2, 1975

[54] PROCESS OF TREATING POLYESTER FIBERS WITH RESINS

[75] Inventors: Ikuji Esaki; Yoshihiro Chikamatsu, both of Gifu, Japan

[73] Assignee: Gisen Co., Ltd., Gifu, Japan

[22] Filed: Dec. 3, 1973

[21] Appl. No.: 421,483

[52] U.S. Cl. .............. 427/202; 427/407; 427/412; 428/270; 428/272; 428/274
[51] Int. Cl.² ........................................ D06C 29/00
[58] Field of Search .......... 117/76 T, 76 R, 138.8 F, 117/135.5, 62.1, 62.2; 108/115.6; 252/8.6; 8/DIG. 18

[56] References Cited
UNITED STATES PATENTS

| | | | |
|---|---|---|---|
| 3,061,473 | 10/1962 | Tesoro | 117/135.5 |
| 3,236,685 | 2/1966 | Caldwell et al. | 117/138.8 |
| 3,521,993 | 7/1970 | Swidler et al. | 8/115.6 |
| 3,574,620 | 4/1971 | Tesoro | 117/62.1 |

Primary Examiner—Cameron K. Weiffenbach
Assistant Examiner—Ralph E. Varndell
Attorney, Agent, or Firm—Haseltine, Lake & Waters

[57] ABSTRACT

A process for the resin treatment of polyester fibers comprising treating the fibers with a compound having the structural formula selected from the group consisting of

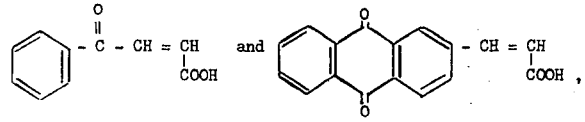

and subsequently treating the resulting fibers with a resin containing —COOCH = CH$_2$ radical, said resin having water-and-oil-repellences and antistatic property, in the presence of reaction initiators. This process is capable of applying resins excellent in friction resistance and washing resistance to polyester fibers.

4 Claims, No Drawings

PROCESS OF TREATING POLYESTER FIBERS WITH RESINS

BACKGROUND OF THE INVENTION

The present invention relates to a process of applying resins having excellent friction resistance and washing resistance to polyester fibers.

The polyester fibers are usually subjected to resin treatment in order to impart thereto a water repellence, an oil repellence and an antistatic property. Moreover, to ensure that the treated fibers have good water and oil repellences and antistatic property, the resin to be applied is required to have excellent friction resistance and washing resistance.

In order to impart to the polyester fibers water and oil repellences and antistatic property, there has been heretofore practiced a process which comprises treating directly the fibers with resins having water and oil repellences and antistatic property.

However, the resins which have been applied to the polyester fibers using such a known treating process are poor in friction resistance and washing resistance, whereby the treated fibers are incapable of maintaining good water and oil repellences and antistatic property to a sufficient degree.

SUMMARY OF THE INVENTION

It is an object of the present invention to remove the aforementioned disadvantages and to provide an improved process of resin treatment.

It is another object of the present invention to provide a process for the resin treatment of polyester fibers which comprises applying resins excellent in friction resistance and washing resistance to the fibers, thereby imparting good water and oil repellences and antistatic property thereto.

In accordance with the present invention, the above objects can be accomplished by providing a process for the resin treatment of polyester fibers which comprises treating the fibers with a compound having the structural formula selected from the group consisting of

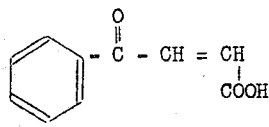

(benzoyl acrylic acid)

and

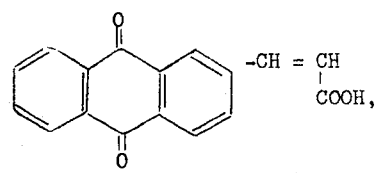

($\beta$-anthraquinone acrylic acid)

and subsequently treating the resulting fibers with a resin containing $-COOCH=CH_2$ radical in the presence of reaction initiators.

DETAILED DESCRIPTION OF THE INVENTION

The present invention includes firstly treating the polyester with a compound having the structural formula selected from the group consisting of

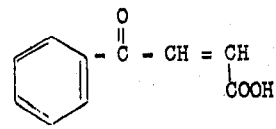

and

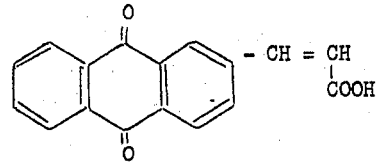

The polyester fibers so treated fixedly adhere to the moiety of

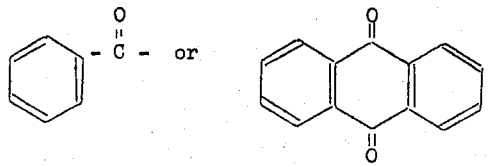

due to their affinity, whereby the polyester fibers and the compounds are firmly bonded.

Such a treatment may be conducted by contacting the polyester fibers with the above-mentioned compounds using a variety of means. For example, when the polyester fibers are dyed, the fibers are contacted with the compounds in a dyeing bath containing the compound added thereto under high temperature and pressure dyeing conditions or normal temperature carrier dyeing conditions, or the compound is sublimed to be brought into contact with the fibers.

The polyester fibers used in the present invention include the cloth or yarn of polyester fibers, or the mixed spun or woven cloth or mixed yarn of polyester fibers and other fibers.

The above-mentioned compounds used in the present invention may be one or two members selected from the above-mentioned group. Although the amount of these compounds used may be optionally determined, it is preferably in the range of from 0.1% to 1.0% by weight with respect to the amount of the polyester fiber to be treated.

According to the present invention, the fibers resulting from the first treating process are subsequently treated with a resin having $-COOCH=CH_2$ radical, said resin having water and oil repellences and antistatic property, in the presence of reaction initiators.

In so treating, the moiety of $-CH=CH.COOH$ which was bonded to the polyester fibers and the $-COOCH=CH_2$ radical in the above resin are bonded together in the presence of reaction initiators, whereby the polyester fibers are firmly bonded with the resin containing the $-COOCH=CH_2$ radical through the compounds.

This treatment is also conducted by means of the conventional known resin treatment method.

In this manner, it is possible to apply a resin having excellent friction resistance and washing resistance to the polyestor fibers according to the present invention, thereby permitting the impartment of satisfactory water and oil repellences and antistatic property to the polyester fibers.

The reaction initiators used in the present invention, include benzoyl peroxide, ammonium persulfate, etc..

The amount of the reaction initiators used may be determined as desired.

As the resin containing —COOCH=CH$_2$ radical used in the present invention, there may be mentioned resin having water and oil repellences and antistatic property such as fluorine-containing resins (Cn F$_{2n+1}$.O.-COCH=CH$_2$), for example, those available under the commercial names "Zoron FR" (obtained from E. I. du Pont de Nemours & Co. USA) and "Scotchguard FC 208" (Sumitomo Three M Co. Ltd., Japan).

In addition, a hand controlling agent, softener, antistatic aiding agent, catalyst and the like may also be used. For example, those available under the commercial names; "Sumitex resin 800S" and "Sumitex resin M-3" (Sumitomo Chemical Co., Japan), "Permax 25" (Yoshimura Petrochemical, Co., Japan), "TH 44" (Nikka Chemical Co., Japan), "softex K206" (Kao-Atlas Co., Japan), "Catalyst O" (Japan-Reichhold Co., Japan) may be used.

The present invention will fully described by the following examples.

EXAMPLE 1

As a polyester fiber, a plain fabric of 100% processed yarn which has been subjected to refining and heat set is used.

The fabric is dyed by immersing it in a dyeing solution consisting of the composition indicated in Table 1 below and having a pH value of 5 to 6 at a temperature of 130°C for about 60 minutes while simultaneously contacting the fabric with the compound

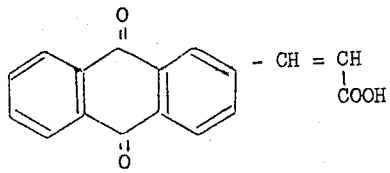

Table 1

| | |
|---|---|
| Color index Disper Blue 71 | 0.2% |
| Color index Disper Red 54 | 0.3% |
| Color index Disper Yellow 13 | 1.2% |
| Dispersing agent | 0.5g/l |
| pH controlling agent (acetic acid) | 0.1cc/l |

Table I — Continued

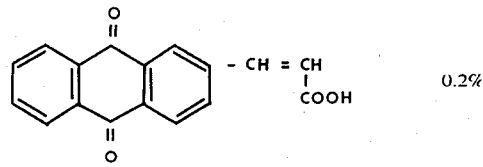

0.2%

The percentage is weight percent on the basis of the weight of the fabric.

After immersing, the fabric is washed with water and dried. The so-treated fabric is called a sample NO. A.

Also, the same procedures as indicated above are carried using a dyeing solution consisting of the above composition containing no compound

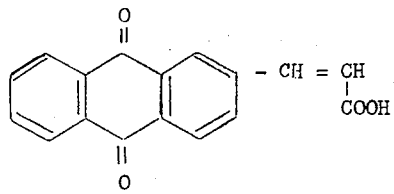

The resulting fabric is called a sample NO. B.

Then, the sample NO.A and NO.B fabrics each are treated with the respective resin solutions containing the following compositions indicated in Table II.

Table II

| | NO. A | | NO. B | |
|---|---|---|---|---|
| | A - I (%) | A - II (%) | B - I (%) | B - II (%) |
| Sumitex resin 800S | 1.0 | 1.0 | 1.0 | 1.0 |
| Catalyst O | 0.1 | 0.1 | 0.1 | 0.1 |
| Zoron FR | 2.8 | | 2.8 | |
| Scotch guard FC208 | | 2.8 | | 2.8 |
| Permax 25 | 1.0 | 1.0 | 1.0 | 1.0 |
| TH 44 | 1.0 | 1.0 | 1.0 | 1.0 |
| Softex K206 | 0.5 | 0.5 | 0.5 | 0.5 |
| Ammonium persulfate | 0.03 | 0.03 | | |

Each of the fabrics NO.A (A-I, A-II) and NO.B (B-I, B-II) so treated is wrung to a 0.70% degree, dried with a hot air at a temperature of 100°C for 3 minutes and further heat treated at 150°C for 3 minutes and then washed with a hot water and finally dried.

The resin treated fabrics are subjected to laundry treatment, dry cleaning treatment and friction treatment, after which they are tested for water repellence, oil repellence and electrification. The results are shown in Table III.

Table III

| Test item | Water Repellence | | | | | | | | | | | | |
|---|---|---|---|---|---|---|---|---|---|---|---|---|---|
| Test method | Laundry | | | | | Dry cleaning | | | | | Friction | | |
| Test number | 1 | 2 | 3 | 4 | 5 | 1 | 2 | 3 | 4 | 5 | 50 | 100 | 200 |
| Sample NO.A | | | | | | | | | | | | | |
| A - I | 90 | 90 | 90 | 90 | 90 | 90 | 90 | 90 | 90 | 90 | 90 | 90 | 90 |
| A - II | 90 | 90 | 90 | 90 | 90 | 90 | 90 | 90 | 90 | 90 | 90 | 90 | 90 |
| Sample NO.B | | | | | | | | | | | | | |
| B - I | 70 | 50 | 50 | 50 | 50 | 70 | 70 | 50 | 50 | 50 | 50 | 50 | 50 |
| B - II | 70 | 50 | 50 | 50 | 50 | 70 | 70 | 50 | 50 | 50 | 50 | 50 | 50 |

Table III—Continued

| Test item | Oil Repellence | | | | | | | | | | | | |
|---|---|---|---|---|---|---|---|---|---|---|---|---|---|
| Test method | Laundry | | | | | Dry cleaning | | | | | Friction | | |
| Test number | 1 | 2 | 3 | 4 | 5 | 1 | 2 | 3 | 4 | 5 | 50 | 100 | 200 |
| Sample NO.A | | | | | | | | | | | | | |
| A - I | 4 | 4 | 4 | 4 | 4 | 4 | 4 | 4 | 4 | 4 | 4 | 4 | 4 |
| A - II | 4 | 4 | 4 | 4 | 4 | 4 | 4 | 4 | 4 | 4 | 4 | 4 | 4 |
| Sample NO.B | | | | | | | | | | | | | |
| B - I | 3 | 3 | 2 | 2 | 2 | 3 | 2 | 2 | 2 | 2 | 2 | 2 | 2 |
| B - II | 3 | 3 | 2 | 2 | 2 | 3 | 2 | 2 | 2 | 2 | 2 | 2 | 2 |

| Test item | Electrification (V) | | | | | | | | | |
|---|---|---|---|---|---|---|---|---|---|---|
| Test method | Laundry | | | | | Dry cleaning | | | | |
| Test number | 1 | 2 | 3 | 4 | 5 | 1 | 2 | 3 | 4 | 5 |
| Sample NO.A | | | | | | | | | | |
| A - I | 80 | 110 | 130 | 190 | 200 | 30 | 90 | 140 | 100 | 180 |
| A - II | 70 | 150 | 200 | 230 | 200 | 40 | 70 | 50 | 120 | 230 |
| Sample NO.B | | | | | | | | | | |
| B - I | 300 | 510 | 720 | 1100 | 2000 | 170 | 430 | 700 | 800 | 1260 |
| B - II | 420 | 690 | 1210 | 1580 | 1690 | 280 | 530 | 1410 | 2300 | 1900 |

These tests were carried out according to the following procedures.

Water repellence test procedure

The water repellence is determined according to JIS L1079 chemical fiber fabric test method 5, 24, 2 water repellence A procedure (a spray method). With regard to evaluation, the maximum is 100 and the minimum is 0 and the values not less than 70 to 80 are good.

Oil repellence test procedure

Machine oil method: one drop (about 0.05g) of machine oil (JIS K22141) is fallen on the sample with a micro spertel, and repellence is determined by the following evaluations. The evaluations of no less than 4 represent a good repellence.

Grade     Condition of machine oil adherence
1     Machine oil is sucked into the sample within a few seconds when dropped thereon.
2     The drop configuration is crushed, but a portion thereof is remained liquid on the surface of the sample.
3     The contact angle between machine oil and the sample is below 90°.
4     The contact angle between machine oil and the sample is above 90° and when the machine oil is sucked up after leaving for 15 minutes a slight adherence is observed.
5     The contact angle between machine oil and the sample is above 90° and when the machine oil is sucked up after leaving for 15 minutes no adherence is observed.

Method of determining electric charge voltage

Four sheets of the sample (3cm × about 30cm) are attached separately from each other to the stationary part of a rotary staticktester, while a sheet of nylong plain fabric (2.5cm × about 15cm) is fixed under said staticktester in the transverse direction with respect to the direction of rotation to contact with said four sheets upon rotation for a friction reference. The rotor is rotated at 800 rpm under load of 500g for 60 records. Then, each of the samples tested is determined for friction electrification voltage (V), and the voltage V is divided by 8 to give an electrification voltage per a sheet of the sample.

Friction method

Gakushin type of fastness to friction tester is used, and the surface of the sample is rubbed forward and backward with cotton cloth (3 cm × 12cm) for 50, 100, 150, 200 times.

Laundry method

The sample is placed in an automatic reverse type of an electric washing machine containing 0.5% detergent at a temperature of 40°C and stirred and washed for 30 minutes. After washing, the sample was centrifugally dehydrated and dried. This is one cycle.

Dry cleaning method

About six sheets of the sample (20 cm × 10 cm) are placed in a cylindrical pot having a diameter of 10 cm and a height of 15 cm and containing 1l of perchloroethylene. Four of the pots are attached to the same rotating axis and the rotating axis is rotated at ambient temperatures and at 42 ± 2 rpm for 30 minutes. At the end of the period, the samples are removed from the pots and naturally dried. This is one cycle.

As is apparent from Table III, the samples (A - I, A - II) resin-treated according to the process of the present invention are more excellent in water repellence, oil repellence, antistatic property than the samples (B - I, B - II) treated according to the conventional method.

EXAMPLE 2

As a polyester fiber, a mixed woven plain fabric of 80% polyester filament and 20% rayon is used.

The fabric is dyed by immersing it in a dyeing solution consisting of the composition indicated in Table IV below and having a pH value of 5 to 6 at a temperature of 120°C for about 60 minutes while simultaneously contacting the fabric with the compound

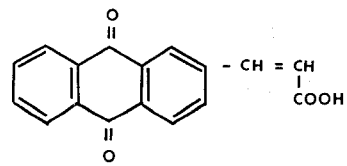

Table IV

| | |
|---|---|
| Color index Disper Blue 71 | 0.1% |
| Color index Disper Red 54 | 0.15% |
| Color ndex Disper Yellow 13 | 0.5% |
| Color index Direct Blue | 0.1% |
| Color index Direct Orange | 0.4% |
| Dispersing agent | 0.5g/l |
| pH controlling agent (aceticacid) | 0.1 cc/l |
| NaCl | 3g/l |

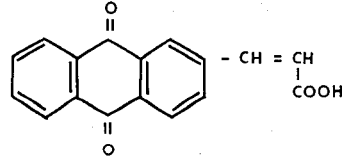

0.3%

The percent is weight percent on the basis of the weight of the fabric.

After immersing, the fabric is washed with water and dried. The so-treated fabric is called a sample NO. C.

Also, the untreated fabric which has not been subjected to said treatment is called NO. D.

Then, the fabrics of the samples NO. C and NO. D are treated with the respective resin solutions containing the following compositions indicated in Table V.

Table V

|  | NO. C | NO. D |
|---|---|---|
| Sumitex resin M-3 | 1.0 | 1.0 |
| Catalyst O | 0.1 | 0.1 |
| Zoron FR | 2.5 | 2.5 |
| Permax 25 | 1.0 | 1.0 |
| TH 44 | 1.0 | 1.0 |
| Softex K206 | 0.5 | 0.5 |
| Ammonium persulfate | 0.03 |  |

The fabrics thus resin-treated are respectively subjected to laundry treatment, dry cleaning treatment and friction treatment, after which they are tested for water repellence, oil repellence and electrification. The results are shown in Table VI.

Table VI

| Test item | Water repellence | | | | | | | | | | | | |
|---|---|---|---|---|---|---|---|---|---|---|---|---|---|
| Test method | Laundry | | | | | Dry cleaning | | | | | Friction | | |
| Test number | 1 | 2 | 3 | 4 | 5 | 1 | 2 | 3 | 4 | 5 | 50 | 100 | 200 |
| Sample NO. C | 90 | 90 | 90 | 90 | 80 | 90 | 90 | 90 | 90 | 80 | 90 | 90 | 80 |
| Sample NO. D | 70 | 70 | 50 | 50 | 50 | 70 | 70 | 50 | 50 | 50 | 50 | 50 | 50 |
| Test item | Oil repellence | | | | | | | | | | | | |
| Test method | Laundry | | | | | Dry cleaning | | | | | Friction | | |
| Test number | 1 | 2 | 3 | 4 | 5 | 1 | 2 | 3 | 4 | 5 | 50 | 100 | 200 |
| Sample NO. C | 4 | 4 | 4 | 4 | 4 | 4 | 4 | 4 | 4 | 4 | 4 | 4 | 4 |
| Sample NO. D | 3 | 3 | 2 | 2 | 2 | 3 | 3 | 3 | 2 | 2 | 2 | 2 | 2 |
| Test item | Electrification (V) | | | | | | | | | | | | |
| Test method | Laundry | | | | | Dry cleaning | | | | | | | |
| Test number | 1 | 2 | 3 | 4 | 5 | 1 | 2 | 3 | 4 | 5 | | | |
| Sample NO. C | 90 | 140 | 170 | 210 | 230 | 60 | 30 | 90 | 110 | 210 | | | |
| Sample NO. D | 320 | 430 | 590 | 610 | 530 | 250 | 390 | 470 | 510 | 720 | | | |

The tests are carried out according to the same procedures as those described in Example 1.

As is apparent from Table VI, the sample (NO. C) resin-treated according to the process of the present invention is more excellent in water repellence, oil repellence and antistatic property than the sample (NO. D) treated according to the conventional process.

Example 3

A plain fabric composed of 100% polyester is immersed in a treating solution consisting of the composition indicated in Table VII below while simultaneously contacting the fabric with the compound

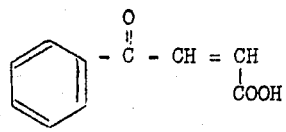

Table VII

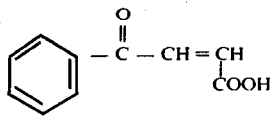

| | 1 (weight percent on the basis of the weight of the fabric) |
|---|---|
| Emulsifying agent | appropriate amount |
| Water | 100 cc |

After immersing, the fabric is dried at 100°C, and further dried at 180°C for 2 minutes. The resulting fabric is called a sample NO. E.

Then, the sample NO. E fabric is treated with the resin solution consisting of the composition indicated in Table VIII.

Table VIII

| Sumitex resin 800S | 1.0% |
|---|---|
| Catalyst O | 0.1% |
| Zoron FR | 2.8% |
| Permax 25 | 1.0% |
| TH 44 | 1.0% |
| Ammonium persulfate | 0.03% |

The fabric thus resin-treated is subjected to laundry treatment, dry cleaning treatment and friction treatment, after which it is tested for water repellence, oil repellence and electrification. The results are shown in Table IX.

Table IX

| Test item | Water repellence | | | | | | | | | | | | |
|---|---|---|---|---|---|---|---|---|---|---|---|---|---|
| Test method | Laundry | | | | | Dry cleaning | | | | | Friction | | |
| Test number | 1 | 2 | 3 | 4 | 5 | 1 | 2 | 3 | 4 | 5 | 50 | 100 | 200 |
| Sample NO. E | 90 | 90 | 90 | 80 | 80 | 90 | 90 | 80 | 80 | 80 | 90 | 90 | 80 |
| Test item | Oil repellence | | | | | | | | | | | | |
| Test method | Laundry | | | | | Dry cleaning | | | | | Friction | | |
| Test number | 1 | 2 | 3 | 4 | 5 | 1 | 2 | 3 | 4 | 5 | 50 | 100 | 200 |
| Sample NO. E | 4 | 4 | 4 | 4 | 4 | 4 | 4 | 4 | 4 | 4 | 4 | 4 | 4 |

The tests are carried out according to the same procedures as those described in Example 1.

As is apparent from Table IX, the sample NO. E resin-treated according to the process of the present invention is excellent in both water repellence and oil repellence.

The fabrics of Example 1, 2 and 3 which are treated according to the present invention possess satisfactory water-and oil-repellences and antistatic property.

In view of the foregoing, it is concluded that the process of the present invention is capable of applying resins excellent in friction resistance and washing resistance to polyester fibers.

What is claimed is:

1. A process for improving the water and oil repellences and antistatic properties of polyester fibers which comprises coating said fibers with a compound having a — CH = CH — COOH radical selected from the group consisting of

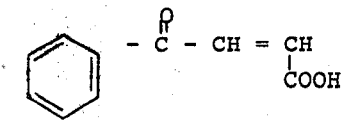

and

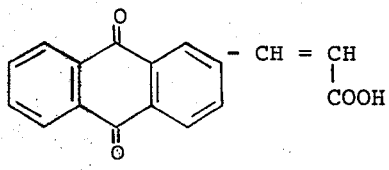

and reacting the thus-coated fiber with a fluorine resin containing a — COOCH = CH₂ radical having water- and oil repellences and antistatic properties in the presence of a reaction iniator thereby to bond said resin to said thus-treated fiber by reaction between said radicals of said compound and said resin.

2. The process according to claim 1 wherein the amount of the compound used is in the range of 0.1% to 1.0% by weight of the polyester fiber to be treated.

3. The process according to claim 1 wherein the reaction initiator is benzoyl peroxide or ammonium persulfate.

4. An article of manufacture comprising:
   a. a polyester fabric substrate, and
   b. a coating thereon, said coating comprising a compound with a — CH=CH — COOH moiety having the structural formula selected from the group consisting of

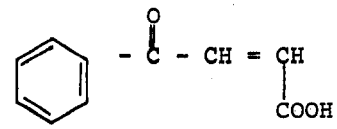

and

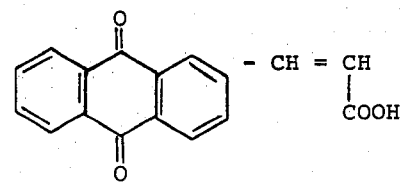

bonded to said substrate through said

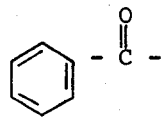 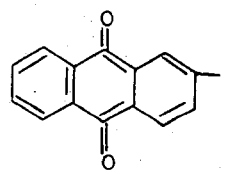

groups of said compound, and a fluorine-containing resin having a — COOCH = CH₂ radical attached to said compound through said moiety.

* * * * *